(12) United States Patent
Takahashi et al.

(10) Patent No.: US 11,979,745 B2
(45) Date of Patent: May 7, 2024

(54) USER EQUIPMENT AND BASE STATION APPARATUS

(71) Applicant: NTT DOCOMO, INC., Tokyo (JP)

(72) Inventors: Hideaki Takahashi, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 286 days.

(21) Appl. No.: 17/610,416

(22) PCT Filed: Apr. 28, 2020

(86) PCT No.: PCT/JP2020/018097
§ 371 (c)(1),
(2) Date: Nov. 10, 2021

(87) PCT Pub. No.: WO2020/230623
PCT Pub. Date: Nov. 19, 2020

(65) Prior Publication Data
US 2022/0210645 A1    Jun. 30, 2022

(30) Foreign Application Priority Data

May 16, 2019  (JP) ................................ 2019-093107

(51) Int. Cl.
*H04W 12/08*  (2021.01)
*H04W 8/24*  (2009.01)

(52) U.S. Cl.
CPC ............. *H04W 12/08* (2013.01); *H04W 8/24* (2013.01)

(58) Field of Classification Search
None
See application file for complete search history.

(56) References Cited

U.S. PATENT DOCUMENTS

2020/0329369 A1*  10/2020  Pals ..................... H04B 7/0417
2021/0153022 A1*  5/2021  Ohlsson .............. H04W 12/037

OTHER PUBLICATIONS

3rd Generation Partnership Project; Technical Specification Group Services and System Aspects; Study on 5G Security Enhancement against False Base Stations (Release 16), Apr. 1, 2019, 3rd Generation Partnership Project (3GPP), TR 33.809 V0.3.0 (Mar. 2019) Apr. 1, 2019. (Year: 2019).*
Notice of Reasons for Refusal issued in Japanese Patent Application No. 2021-519365 dated Jun. 16, 2022 (5 pages).
International Search Report issued in PCT/JP2020/018097 dated Jul. 14, 2020 (3 pages).
Written Opinion of the International Searching Authority issued in PCT/JP2020/018097 dated Jul. 14, 2020 (3 pages).

(Continued)

*Primary Examiner* — Nelson S. Giddins
(74) *Attorney, Agent, or Firm* — Osha Bergman Watanabe & Burton LLP

(57) ABSTRACT

A user equipment includes a receiving unit configured to receive, from a base station apparatus, information for requesting a report of a User Equipment (UE) capability, a control unit configured to generate the report including a supported UE capability, and a transmitting unit configured to, in a case where an Access Stratum (AS) security with the base station apparatus is activated, transmit the report to the base station apparatus.

3 Claims, 7 Drawing Sheets

(56) References Cited

OTHER PUBLICATIONS

3GPP TS 38.300 V15.5.0; "3rd Generation Partnership Project; Technical Specification Group Radio Access Network; NR; NR and NG-RAN Overall Description; Stage 2 (Release 15)"; Mar. 2019 (97 pages).

3GPP TS 38.306 V15.5.0; "3rd Generation Partnership Project; Technical Specification Group Radio Access Network; NR; User Equipment (UE) radio access capabilities (Release 15)"; Mar. 2019 (49 pages).

3GPP TR 33.809 V0.3.0; "3rd Generation Partnership Project; Technical Specification Group Services and System Aspects; Study on 5G Security Enhancement against False Base Stations (Release 16)"; Mar. 2019 (28 pages).

* cited by examiner

USER EQUIPMENT AND BASE STATION APPARATUS

TECHNICAL FIELD

The present invention relates to a user equipment and a base station apparatus in a wireless communication system.

BACKGROUND ART

In New Radio (NR) (also referred to as "5G"), which is the successor system of Long Term Evolution (LTE), techniques for satisfying, as required conditions, a large capacity system, high data transmission speed, low delay, and simultaneous connection of many terminals, low cost, power saving, and the like are being studied (for example, see Non-Patent Document 1).

In the LTE system or the NR system, the network inquires of a User Equipment (UE) to acquire information about the radio access capability of the UE. The radio access capability of the UE that includes, such as, for example, a maximum supported data rate, a layer 2 total buffer size, a supported combination of bands, parameters related to a Packet Data Convergence Protocol (PDCP) layer, parameters related to a Radio Link Control (RLC) layer, parameters related to a Medium Access Control (MAC) layer, parameters related to a physical layer, or the like (for example, Non-Patent Document 2).

RELATED ART DOCUMENT

Non-Patent Document

Non-Patent Document 1: 3GPP TS 38.300 V15.5.0 (2019-03)
Non-Patent Document 2: 3GPP TS 38.306 V15.5.0 (2019-03)

SUMMARY OF THE INVENTION

Problem to be Solved by the Invention

In the conventional technique, when the network acquires information about the radio access capability of the UE, encryption and integrity assurance may not be activated. For this reason, the radio access capability of the UE may be tampered by a man-in-the-middle attack, and the radio access performance of the UE may decrease.

The present invention has been made in view of the above issues, and it is an object of the present invention to improve the security when a report relating to the capability of a user equipment is transmitted to a network in a wireless communication system.

Means for Solving the Problem

According to the technique of the present disclosure, provided is a user equipment that includes a receiving unit configured to receive, from a base station apparatus, information for requesting a report of a User Equipment (UE) capability, and a control unit configured to generate the report including a supported UE capability, the user equipment being configured to, in a case where an Access Stratum (AS) security with the base station apparatus is activated, transmit the report to the base station apparatus.

Advantage of the Invention

According to the technique of the present disclosure, the security can be improved when a report relating to the capability of a user equipment is transmitted to a network in a wireless communication system.

EMBODIMENTS OF THE INVENTION

An embodiment of the present invention will be hereinafter described with reference to drawings. The embodiment described below is an example, and the embodiment to which the present invention is applied is not limited to the following embodiment.

In an operation of a wireless communication system according to the embodiment of the present invention, existing techniques are used as appropriate. However, an example of existing technique includes an existing LTE, but is not limited to the existing LTE. In addition, the term "LTE" used in this specification has a broad meaning including LTE-Advanced, specifications newer than LTE-Advanced (e.g., NR), unless otherwise specified.

The embodiment of the present invention explained below uses terms such as SS (Synchronization signal), PSS (Primary SS), SSS (Secondary SS), PBCH (Physical broadcast channel), PRACH (Physical random access channel), and the like used for existing LTE. But this is for the sake of convenience in description. Signals, functions, and the like similar to these terms may also be referred to as other names. Terms in NR corresponding to these terms in LTE are NR-SS, NR-PSS, NR-SSS, NR-PBCH, NR-PRACH, and the like. However, even signals used in NR, a prefix "NR-" may not be necessarily attached.

In the embodiment of the present invention, the duplex method may be a TDD (Time Division Duplex) system, an FDD (Frequency Division Duplex) system, or others (for example, Flexible Duplex and the like).

Further, in the embodiment of the present invention, "to configure" a radio parameter or the like may be that a predetermined value is configured in advance (Pre-configure), or that a radio parameter notified from a base station apparatus 10 or a user equipment 20 is configured.

Figure 1:
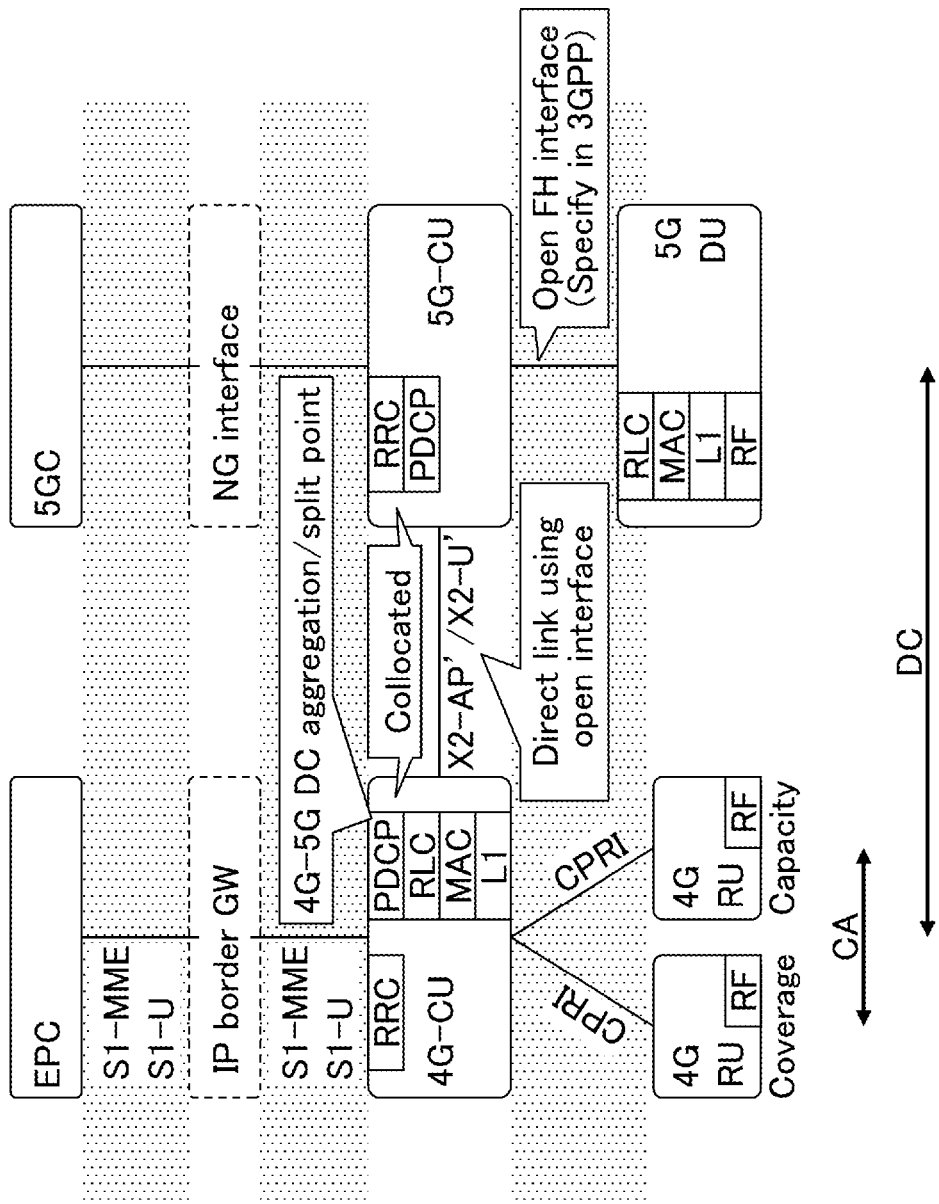
FIG. 1 is a figure illustrating a configuration example of a network architecture according to an embodiment of the present invention.

FIG. 1 is a figure illustrating a configuration example of a network architecture according to the embodiment of the present invention. As illustrated in FIG. 1, a radio network architecture according to the embodiment of the present invention includes a 4G-CU, a 4G-RU (Remote Unit, remote radio station), an EPC (Evolved Packet Core), and the like at the LTE-Advanced side. The radio network architecture according to the embodiment of the present invention includes a 5G-CU, a 5G-DU, and the like at the 5G side.

As illustrated in FIG. 1, the 4G-CU includes layers of RRC (Radio Resource Control), PDCP (Packet Data Convergence Protocol), RLC (Radio Link Control), MAC (Medium Access Control), and L1 (layer 1, PHY layer or a physical layer), and is connected to a CPRI (Common Public Radio Interface) to a 4G-RU. A network node including the 4G-CU and the 4G-RU is referred to as an eNB.

At the 5G side, as illustrated in FIG. 1, a 5G-CU includes an RRC layer, and is connected to a 5G-DU via an FH (Fronthaul) interface, and is connected to a 5GC (5G Core Network) via an NG interface (NG interface). Also, the 5G-CU is connected to the 4G-CU via an X2 interface. The PDCP layer of the 4G-CU serves as a joining or separation point in a case of performing 4G-5G DC (Dual Connectivity), i.e., EN-DC (E-UTRA-NR Dual Connectivity). A network node including the 5G-CU and the 5G-DU is referred to as a gNB. The 5G-CU may be referred to as a gNB-CU, and the 5G-DU may be referred to as a gNB-DU.

Also, as illustrated in FIG. 1, CA (Carrier Aggregation) between 4G-RUs is performed, and DC is performed between the 4G-RU and the 5G-DU. Although not illustrated, the User Equipment (UE) is wirelessly connected via the RF of the 4G-RU or the 5G-DU to transmit and receive packets.

It should be noted that FIG. 1 illustrates a radio network architecture during the DC of the LTE-NR, i.e., the EN-DC (E-UTRA-NR Dual Connectivity). However, in a case where the 4G-CU is separated to CU-DU, or NR standalone operation is performed, a similar radio network architecture may also be used. In the case where the 4G-CU is separated to CU-DU, the functions related to the RRC layer and the PDCP layer may be moved to the 4G-CU, and the RLC layer and lower layers may be included in the 4G-DU. It should be noted that, by separating the CU and the DU, the date rate of the CPRI may be reduced.

It should be noted that multiple 5G-DUs may be connected to the 5G-CU. When the UE connects to multiple 5G-CUs, a NR-DC (NR-NR Dual Connectivity) may be performed, and when the UE connects to multiple 5G-DUs and a single 5G-CU, the NR-DC may be performed. Note that the 5G-CU may be directly connected to an EPC without going through the 4G-CU, and 4G-CU may be directly connected to a 5GC without going through the 5G-CU.

Figure 2:
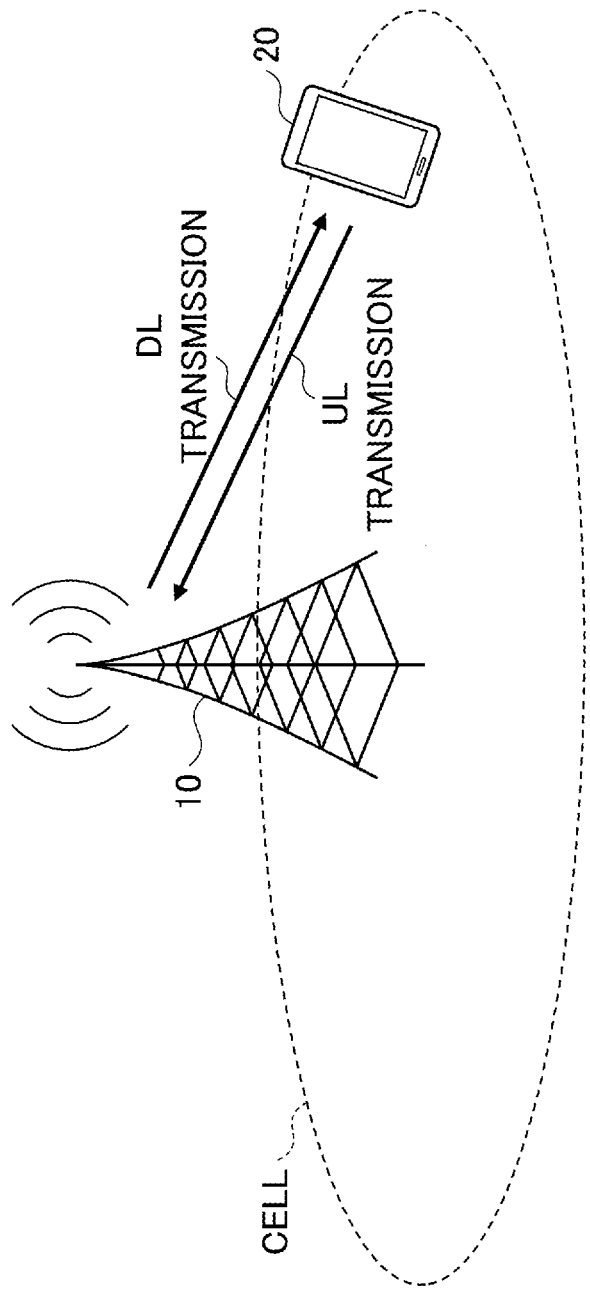
FIG. 2 is a figure illustrating a configuration example of a wireless communication system according to the embodiment of the present invention.

FIG. 2 is a drawing for explaining a wireless communication system according to an embodiment of the present invention. As illustrated in FIG. 2, a wireless communication system according to an embodiment of the present invention includes a base station apparatus 10 and a user equipment 20. In FIG. 2, one base station apparatus 10 and one user equipment 20 are illustrated, but this is only an example. Alternatively, a plurality of base station apparatuses 10 and user equipments 20 may be provided.

The base station apparatus 10 provides one or more cells, and is a communication apparatus wirelessly communicating with the user equipment 20. The physical resource of a radio signal is defined by time domain and frequency domain. Time domain may be defined by OFDM symbol number. Frequency domain may be defined by the number of subcarriers or the number of resource blocks. The base station apparatus 10 transmits a synchronization signal and system information to the user equipment 20. The synchronization signal is, for example, NR-PSS and NR-SSS. The system information is transmitted in, for example, NR-PBCH, and is also referred to as broadcast information. As illustrated in FIG. 2, the base station apparatus 10 transmits a control signal or data to the user equipment 20 through DL (Downlink), and receives a control signal or data from the user equipment 20 through UL (Uplink). Both the base station apparatus 10 and the user equipment 20 can transmit and receive signals by performing beamforming. In addition, both the base station apparatus 10 and the user equipment 20 can apply communication by MIMO (Multiple Input Multiple Output) to DL or UL. Further, both the base station apparatus 10 and the user equipment 20 may communicate via SCell (Secondary Cell) and PCell (Primary Cell) by CA (Carrier Aggregation).

The user equipment 20 is a communication apparatus equipped with a wireless communication function such as a smartphone, a mobile phone, a tablet, a wearable terminal, and a communication module for M2M (Machine-to-Machine). As illustrated in FIG. 2, the user equipment 20 receives control signals or data from the base station apparatus 10 in DL, and transmits control signals or data to the base station apparatus 10 in UL, thereby using various communication services provided by the wireless communication system.

Here, in the current specification for the RRC in the LTE or NR, an enquiry about UE capability, i.e., "UECapabilityEnquiry", is permitted to be transmitted from the base station apparatus 10 to the user equipment 20 before an access layer, i.e., Access Stratum (AS) security procedure, is completed. Therefore, a report of the UE capability, i.e., "UECapabilityInformation", may be tampered by the man-in-the-middle attack. Therefore, the user equipment 20 may execute a wireless communication with the base station apparatus 10 based on the tampered "UECapabilityInformation", which may possibly reduce the performance of the communication.

Figure 3:
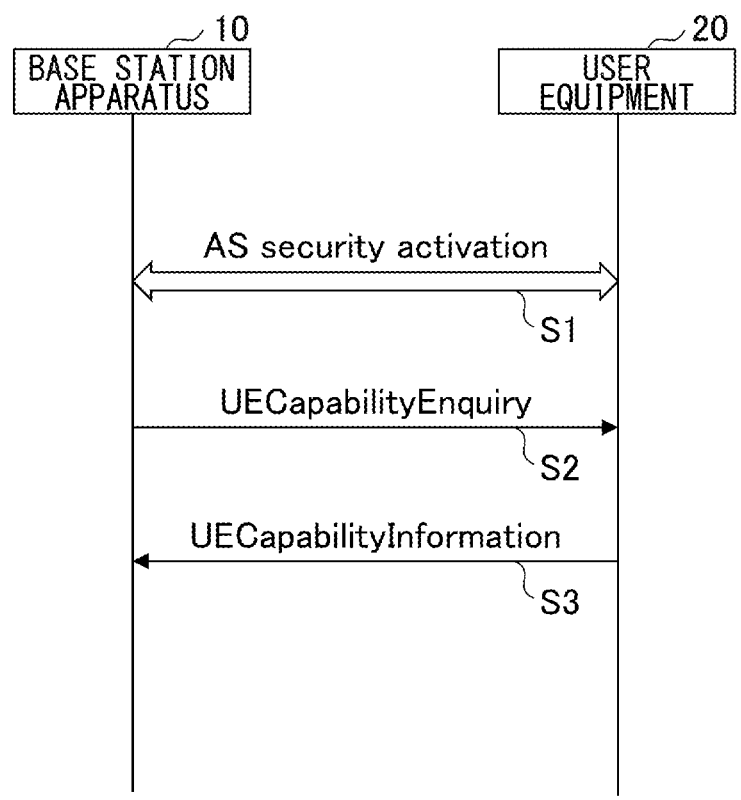
FIG. 3 is a sequence diagram for explaining an operation example according to the embodiment of the present invention.

FIG. 3 is a sequence diagram for explaining an operation example according to the embodiment of the present invention. In step S1 as illustrated in FIG. 3, the base station apparatus 10 and the user equipment 20 activate "AS security activation", i.e., AS security. In step S2 which is subsequent thereto, the base station apparatus 10 transmits "UECapabilityEnquiry", i.e., an enquiry about the UE capability to the user equipment 20. In step S3 which is subsequent thereto, the user equipment 20 transmits "UECapabilityInformation", i.e., a report of the UE capability, to the base station apparatus 10. The "UECapabilityInformation" includes UE capability supported by the user equipment 20. The base station apparatus 10 identifies the supported UE capability based on the received "UECapabilityInformation".

After the AS security is activated in step S1, the UE capability is obtained by the network with the "UECapabilityEnquiry" in step S2 and the "UECapabilityInformation" in step S3. Therefore, the chance of tampering of the "UECapabilityInformation" is reduced.

Figure 4:
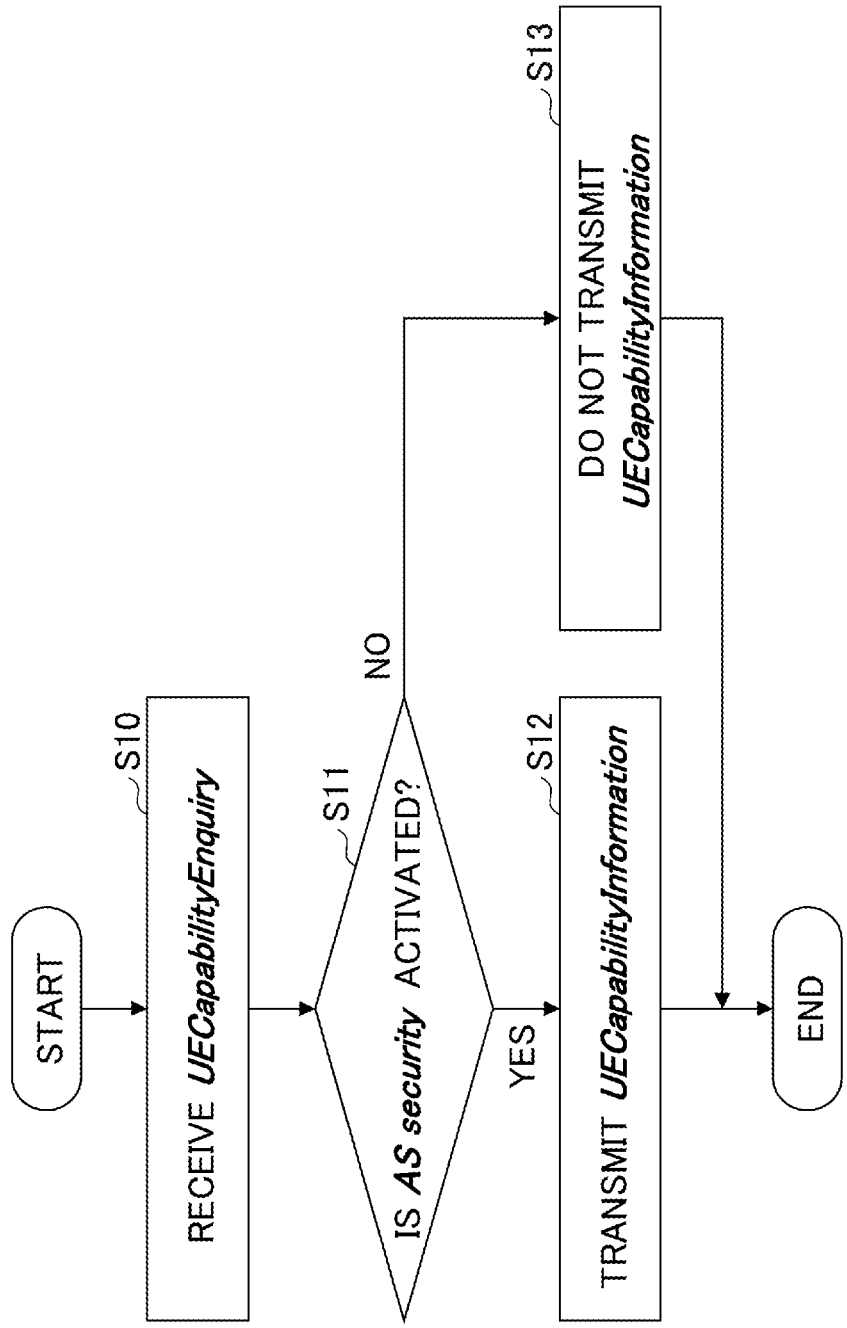
FIG. 4 is a flowchart (1) for explaining an operation example according to the embodiment of the present invention.

FIG. 4 is a flowchart (1) for explaining an operation example according to the embodiment of the present invention. The operation example of the user equipment 20 will be explained with reference to the flowchart illustrated in FIG. 4.

In step S10, the user equipment 20 receives "UECapabilityEnquiry" from the base station apparatus 10. Subsequently, in step S11, the user equipment 20 determines whether the AS security is activated. In a case where the AS security is activated (YES in S11), the user equipment proceeds to step S12, and in a case where the AS security is not activated (NO in S11), the user equipment proceeds to step S13.

In step S12, the user equipment 20 transmits "UECapabilityInformation" to the base station apparatus 10. In step S13, the user equipment 20 does not transmit the "UECapabilityInformation" to the base station apparatus 10.

It should be noted that, for example, in a case where the AS security is not activated in step S11, the user equipment 20 may disregard the "UECapbilityEnquiry". Also, for example, in step S13, the user equipment 20 may transmit to the base station apparatus 10 a notification indicating that the "UECapabilityEnquiry" has failed since the AS security has not been activated.

Figure 5:
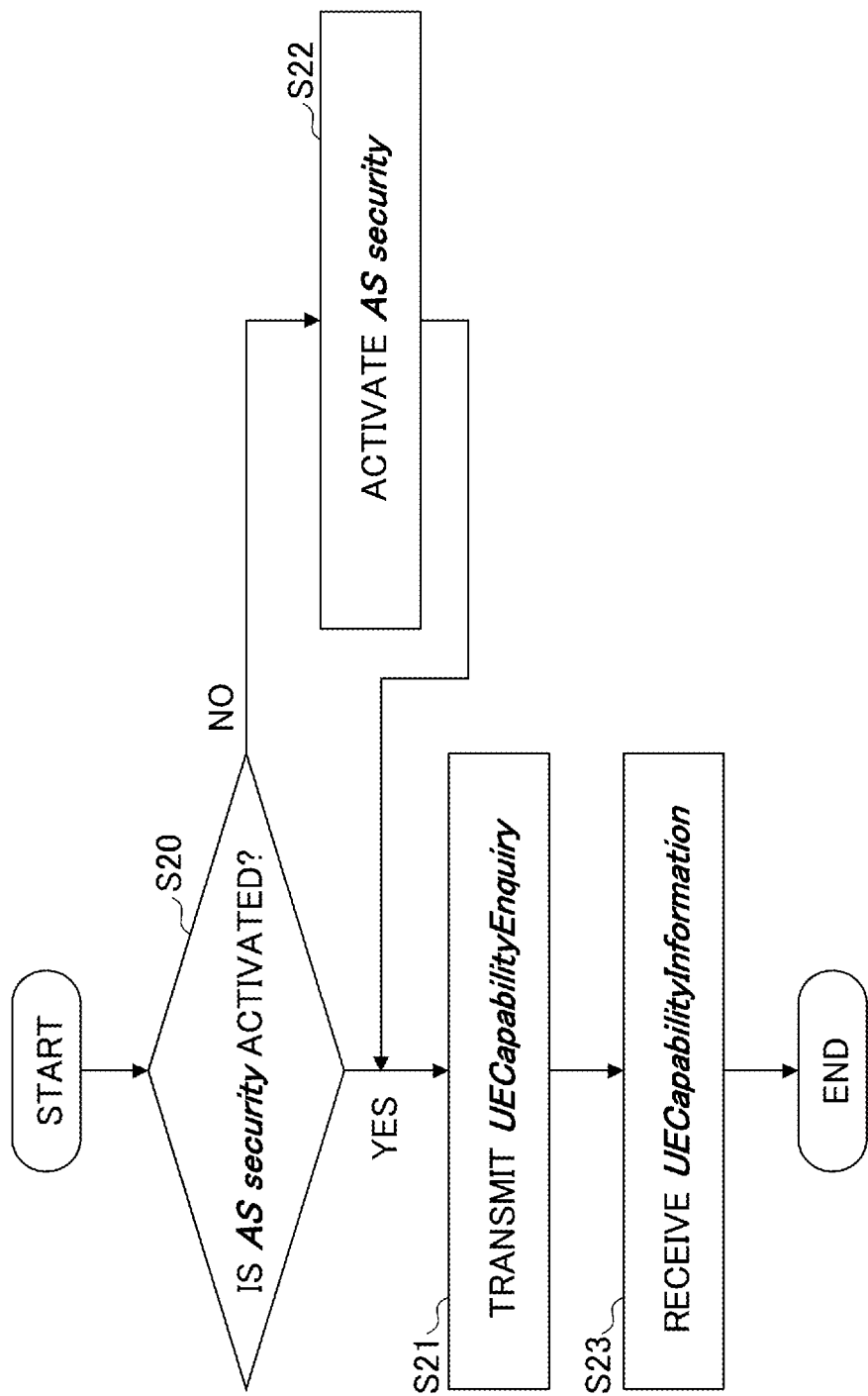
FIG. 5 is a flowchart (2) for explaining an operation example according to the embodiment of the present invention.

FIG. 5 is a flowchart (2) for explaining an operation example according to the embodiment of the present invention. The operation example of the base station apparatus 10 will be explained with reference to the flowchart illustrated in FIG. 5.

In step S20, the base station apparatus 10 determines whether the AS security is activated. In a case where the AS security is activated (YES in S20), the base station apparatus 10 proceeds to step S21, and in a case where the AS security is not activated (NO in S20), the base station apparatus 10 proceeds to step S22.

In step S21, the base station apparatus 10 transmits "UECapbilityEnquiry" to the user equipment 20 and proceeds to step S23. In step S22, the base station apparatus 10 activates the AS security and proceeds to step S21. In step S23, the base station apparatus 10 receives "UECapabilityInformation" from the user equipment 20.

According to the above embodiment, the user equipment 20 can transmit a report of the UE capability to the base station apparatus 10 while the AS security is activated.

In other words, the security can be improved when a report relating to the capability of a user equipment is transmitted to a network in a wireless communication system.

<Apparatus Configuration>

Next, an example of functional configuration of the base station apparatus 10 and the user equipment 20 that execute the processing and operations described so far will be described. The base station apparatus 10 and the user equipment 20 include a function for implementing the above-described embodiment. However, each of the base station apparatus 10 and the user equipment 20 may have only some of the functions in the embodiment.

<Base Station Apparatus 10>

Figure 6:
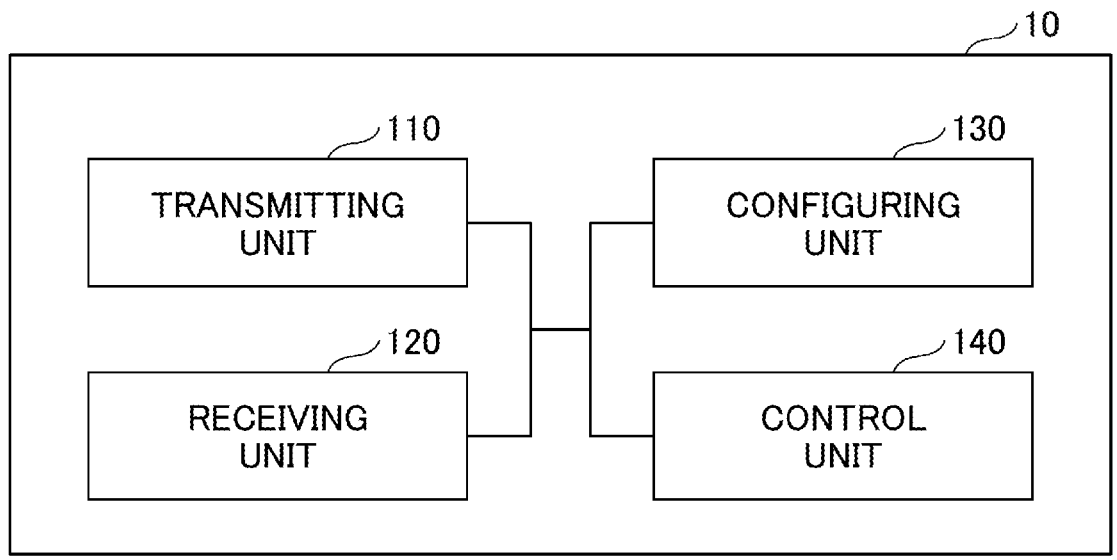
FIG. 6 is a drawing illustrating an example of a functional configuration of a base station apparatus 10 according to the embodiment of the present invention.

FIG. 6 is a drawing illustrating an example of a functional configuration of the base station apparatus 10 according to the embodiment of the present invention. As illustrated in FIG. 6, the base station apparatus 10 includes a transmitting unit 110, a receiving unit 120, a configuring unit 130, and a control unit 140. The functional configuration illustrated in FIG. 6 is only an example. As long as the operation according to the embodiment of the present invention can be executed, the functions may be divided in any way, and the functional units may be given any names.

The transmitting unit 110 includes a function of generating signals to be transmitted to the user equipment 20 and wirelessly transmitting the signals. Also, the transmitting unit 110 transmits messages, exchanged between network nodes, to another network node. The receiving unit 120 includes a function of receiving various types of signals transmitted from the user equipment 20 and acquiring, for example, information on a higher layer from the received signals. Further, the transmitting unit 110 has a function of transmitting NR-PSS, NR-SSS, NR-PBCH, a DL/UL control signal, or the like to the user equipment 20. Also, the receiving unit 120 receives messages, exchanged between network nodes, from another network node.

The configuring unit 130 stores configuration information configured in advance and various configuration information to be transmitted to the user equipment 20. The contents of the configuration information are, for example, information about transmission and reception configuration according to the UE capability of the user equipment 20.

As described in the embodiment, the control unit 140 performs control related to process of UE capability reports received from the user equipment 20. A functional unit configured to transmit signals in the control unit 140 may be included in the transmitting unit 110, and a functional unit configured to receive signals in the control unit 140 may be included in the receiving unit 120.

<User Equipment 20>

Figure 7:
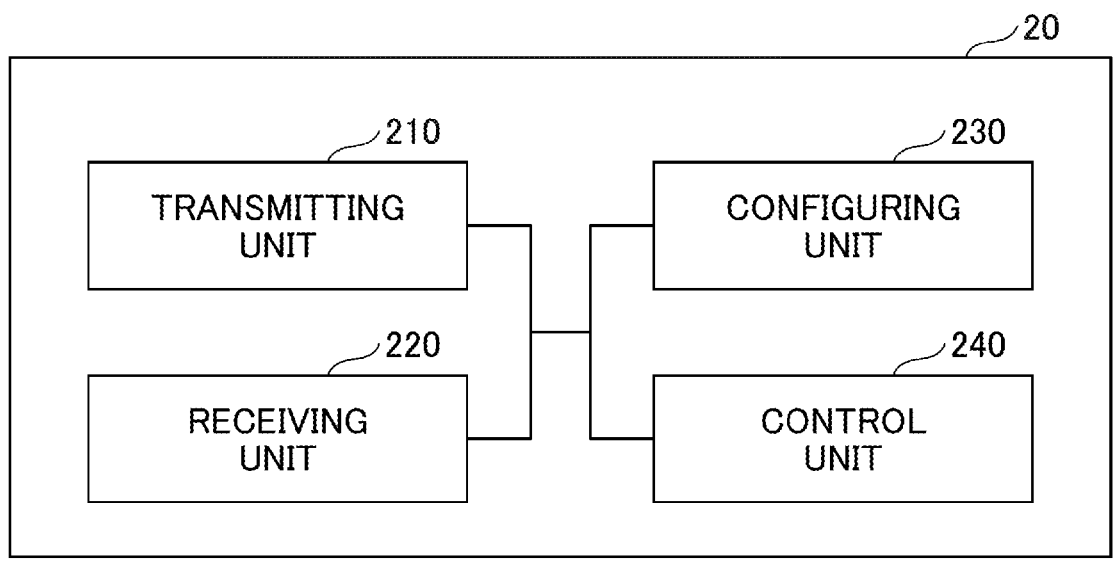
FIG. 7 is a drawing illustrating an example of a functional configuration of a user equipment 20 according to the embodiment of the present invention.

FIG. 7 is a drawing illustrating an example of a functional configuration of the user equipment 20 according to the embodiment of the present invention. As illustrated in FIG. 7, the user equipment 20 includes a transmitting unit 210, a receiving unit 220, a configuring unit 230, and a control unit 240. The functional configuration illustrated in FIG. 7 is merely an example. As long as the operation according to the embodiment of the present invention can be executed, the functions may be divided in any way, and the functional units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer. Also, the receiving unit 220 has a function of receiving NR-PSS, NR-SSS, NR-PBCH, DL/UL/SL control signals, reference signals, and the like that are transmitted from the base station apparatus 10. Also, for example, in D2D communication, the transmitting unit 210 transmits, to another user equipment 20, a PSCCH (Physical Sidelink Control Channel), a PSSCH (Physical Sidelink Shared Channel), a PSDCH (Physical Sidelink Discovery Channel), a PSBCH (Physical Sidelink Broadcast Channel), and the like. The receiving unit 220 receives the PSCCH, the PSSCH, the PSDCH, the PSBCH, and the like, from the another user equipment 20.

The configuring unit 230 stores in a storage device various types of configuration information received from the base station apparatus 10 by the receiving unit 220. The configuring unit 230 also stores configuration information configured in advance. The contents of the configuration information are, for example, information about transmission and reception configuration according to the UE capability.

As described in the embodiment, the control unit 240 performs control related to process of UE capability reports of the user equipment 20. A functional unit configured to transmit signals in the control unit 240 may be included in the transmitting unit 210, and a functional unit configured to receive signals in the control unit 240 may be included in the receiving unit 220.

<Hardware Configuration>

The block diagrams (FIGS. 6 and 7) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 8:
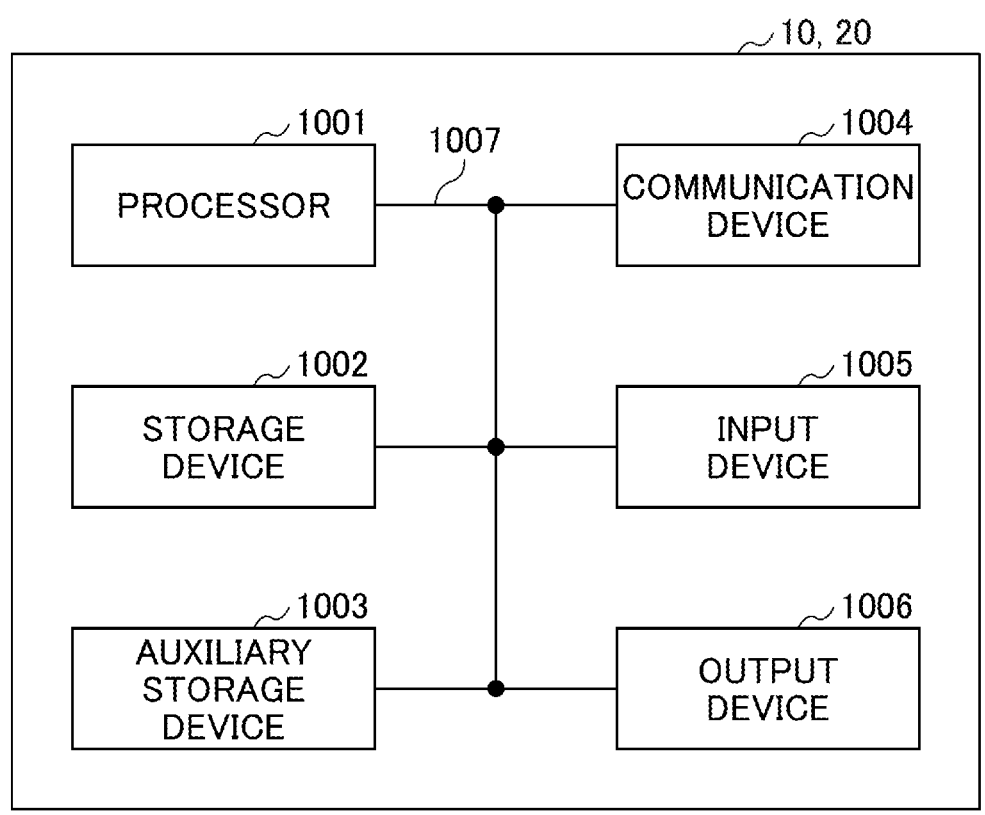
FIG. 8 is a drawing illustrating an example of a hardware configuration of the base station apparatus 10 or the user equipment 20 according to the embodiment of the present invention.

For example, the base station apparatus 10, the user equipment 20, and the like according to one embodiment of the present disclosure may function as a computer that performs processing of a wireless communication according to the present disclosure. FIG. 8 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 6, may be implemented by a control program that is stored in the storage device 1002 and that is executed by the processor 1001. Also, for example, the control unit 240 of the user equipment 20, as illustrated in FIG. 7, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Conclusion of the Embodiments

As explained above, according to the embodiments of the present invention, provided is a user equipment includes a receiving unit configured to receive, from a base station apparatus, information for requesting a report of a User Equipment (UE) capability, a control unit configured to generate the report including a supported UE capability, and a transmitting unit configured to, in a case where an Access Stratum (AS) security with the base station apparatus is activated, transmit the report to the base station apparatus.

According to the above configuration, the user equipment 20 can transmit a report of a UE capability to the base station apparatus 10 while the AS security is activated. In other words, the security can be improved when a report relating to the capability of the user equipment is transmitted to the network in a wireless communication system.

In a case where the Access Stratum (AS) security with the base station apparatus is not activated, the transmitting unit may not transmit the report to the base station apparatus. According to the above configuration, the user equipment 20 can prevent a transmission of the report of the UE capability to the base station apparatus 10 while the AS security is not activated.

In a case where the Access Stratum (AS) security with the base station apparatus is not activated, the transmitting unit may disregard the information for requesting the report. According to the above configuration, the user equipment 20 can prevent a transmission of the report of the UE capability to the base station apparatus 10 while the AS security is not activated.

As explained above, according to the embodiments of the present invention, provided is a base station apparatus including a transmitting unit configured to transmit, to a user equipment, information for requesting a report of a User Equipment (UE) capability, a receiving unit configured to receive the report from the user equipment, and a control unit configured to identify a supported UE capability based on the report, wherein in a case where the Access Stratum (AS) security with the user equipment is activated, the transmitting unit transmits the information for requesting the report to the user equipment.

According to the above configuration, the user equipment 20 can transmit a report of a UE capability to the base station apparatus 10 while the AS security is activated. In other words, the security can be improved when a report relating to the capability of the user equipment is transmitted to the network in a wireless communication system.

Supplemental Embodiments

The embodiments of the present invention have been described above, but the disclosed invention is not limited to the above embodiments, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, and contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, "UECapabilityEnquiry" is an example of information for requesting a report of UE capability. "UECapabilityInformation" is an example of a report of UE capability.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

This international patent application claims priority based on Japanese Patent Application No. 2019-093107 filed on May 16, 2019. The entire contents of Japanese Patent Application No. 2019-093107 are incorporated herein by reference.

LIST OF REFERENCE SYMBOLS 10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:
1. A terminal comprising:
a receiver configured to receive, from a base station, information for requesting a report of a User Equipment (UE) capability;
a processor configured to generate the report including a supported UE capability; and
a transmitter configured to, in a case where an Access Stratum (AS) security with the base station is activated, transmit the report to the base station,
wherein the case where the AS security is activated is a case where encryption and integrity assurance are activated, and
wherein, upon detecting that the integrity assurance of the AS security is not activated for the information requesting the report, the receiver disregards the information requesting the report.

2. The terminal according to claim 1, wherein in a case where the AS security with the base station is not activated, the transmitter does not transmit the report to the base station.

3. A radio communication system comprising:
   a base station; and
   a terminal,
   wherein the base station includes
      a first transmitter configured to transmit, to the terminal, information for requesting a report of a User Equipment (UE) capability,
   wherein the terminal includes
      a receiver configured to receive the information for requesting the report from the base station;
      a processor configured to generate the report including a supported UE capability; and
      a second transmitter configured to, in a case where an Access Stratum (AS) security with the base station is activated, transmit the report to the base station,
      wherein the case where the AS security is activated is a case where encryption and integrity assurance are activated, and
      wherein, upon detecting that the integrity assurance of the AS security is not activated for the information requesting the report, the receiver disregards the information requesting the report.

* * * * *